United States Patent
Johns et al.

(10) Patent No.: US 11,406,955 B2
(45) Date of Patent: Aug. 9, 2022

(54) AIR LANCE FOR REMOVING PELLETS FROM A TUBE

(71) Applicant: Tubemaster, Inc., Louisville, KY (US)

(72) Inventors: Clifford L Johns, Plano, TX (US); Dennis Patrick McAndrews, Jeffersonville, IN (US)

(73) Assignee: Tubemaster, Inc., Louisville, KY (US)

( * ) Notice: Subject to any disclaimer, the term of this patent is extended or adjusted under 35 U.S.C. 154(b) by 91 days.

(21) Appl. No.: 16/816,939

(22) Filed: Mar. 12, 2020

(65) Prior Publication Data

US 2020/0338513 A1    Oct. 29, 2020

Related U.S. Application Data

(60) Provisional application No. 62/825,836, filed on Mar. 29, 2019.

(51) Int. Cl.
*B01J 8/00* (2006.01)
*B01J 8/06* (2006.01)

(52) U.S. Cl.
CPC .............. *B01J 8/004* (2013.01); *B01J 8/003* (2013.01); *B01J 8/06* (2013.01); *B01J 2208/00761* (2013.01)

(58) Field of Classification Search
CPC ... B01J 8/004; B01J 8/003; B01J 8/002; B01J 8/0025; B01J 8/0015; B01J 8/06; B01J 2208/00761; B01J 2208/00769
See application file for complete search history.

(56) References Cited

U.S. PATENT DOCUMENTS

| | | | |
|---|---|---|---|
| 1,020,612 A | 3/1912 | Lawton | |
| 1,058,189 A | 4/1913 | McBoyle | |
| 2,645,528 A | 7/1953 | Thorsen | |
| 3,698,510 A | 10/1972 | Blatt et al. | |
| 4,508,577 A | 4/1985 | Conn et al. | |
| 4,813,611 A | 3/1989 | Fontana | |
| 5,222,533 A | 6/1993 | Porter, Jr. | |
| 5,228,484 A | 7/1993 | Johnson | |
| 5,617,609 A | 4/1997 | Bently | |
| 5,942,045 A * | 8/1999 | Raghavan | B05B 1/042 134/34 |
| 6,402,062 B1 * | 6/2002 | Bendig | B21B 45/08 239/599 |
| 2002/0139396 A1 | 10/2002 | Yunoki | |
| 2003/0041484 A1 | 3/2003 | Russo et al. | |

FOREIGN PATENT DOCUMENTS

| GB | 2173122 A | 10/1986 |
|---|---|---|
| WO | WO 1998/02239 A1 | 1/1998 |
| WO | WO 2020/153127 * | 1/2020 |

OTHER PUBLICATIONS

Machine Translation of WO 2020153127 (Year: 2020).*

* cited by examiner

*Primary Examiner* — Lessanework Seifu
(74) *Attorney, Agent, or Firm* — Duncan Galloway Greenwald PLLC; Kevin T. Duncan

(57) ABSTRACT

An air lance for removing pellets from tubes may include a nozzle with an inner surface having converging and diverging portions adjacent the downstream end of the nozzle to improve air flow. The air lance may include a projection fixed relative to the nozzle and extending beyond the downstream end of the nozzle to serve as a feeler, a poker, and a spacer.

17 Claims, 7 Drawing Sheets

AIR LANCE FOR REMOVING PELLETS FROM A TUBE

This application claims priority from U.S. Ser. No. 62/825,836, filed Mar. 29, 2019. The present invention relates to a device for unloading catalyst or other pellets from tubes. More specifically, it relates to an air lance used to direct a pressurized fluid into the tubes to assist in dislodging the pellets.

BACKGROUND

Many chemical reactors are essentially large shell and tube heat exchanger vessels, with the reaction occurring inside the tubes and a coolant circulating in the vessel outside the tubes. A chemical reactor vessel also can be a simple tank with a single volume of catalyst inside it, or it may be a single large tube. Some chemical reactions occur in furnace or reformer tubes, which may be a part of a system with from 10 to 5,000 or more such tubes. In any of these reactor vessels, catalyst, typically in the form of pellets, may be loaded into the reactor to facilitate the reaction. The catalyst is replaced periodically.

The reactor tubes may be quite long, housed in a structure several stories tall. In order to replace the catalyst, the old, spent catalyst must first be removed from the reactor tubes. In the prior art, springs are first removed from the bottom of each tube in the reactor and then a fish tape is manually pushed up from the bottom of each tube to jostle the catalyst pellets and allow the catalyst pellets to fall out the bottom of each tube.

Sometimes, instead of poking at the catalyst pellets from the bottom of a tube using a fish tape, an air lance is inserted from the top of the tube, and pressurized air is used to dislodge and fluidize the catalyst pellets, which are then evacuated from the top of the tube using a vacuum arrangement.

An air lance for unloading catalyst from a reactor typically includes at least two components—(1) a nozzle to direct pressurized fluid (referred to hereinafter as air, though other fluids may be used) at the catalyst in the reactor and (2) a length of hose to convey pressurized air from a compressed air source to the nozzle at the end of the hose. The principle is to blow the pressurized air out the nozzle to fluff up and fluidize the catalyst so it may be sucked up into the vacuum arrangement.

The reactor tubes typically have a fairly small diameter (they generally range in diameter from ⅝" up to 4"). The catalyst pellets tend to bridge fairly easily in the tube, getting jammed and resisting efforts to unload them from the tubes. Of course, the nozzle and the hose itself get in the way of the catalyst pellets, making the effective cross-sectional area for exhausting the catalyst pellets even smaller, exacerbating the bridging tendency of the catalyst pellets. For this reason, it is desirable to use the smallest possible nozzle to fluidize the catalyst pellets. A smaller nozzle is less likely to provide an opportunity for bridging, and it can make use of a smaller diameter hose to deliver the pressurized air to the nozzle, which again reduces the opportunity for bridging.

However, for a given compressed air pressure, a smaller nozzle will deliver a smaller volume of air, which results in a lower force being exerted on the catalyst pellets by the stream of pressurized air exiting the nozzle. Therefore, the constraining factors work against each other when trying to unload catalyst pellets from the reactor tube. It is desirable to have a large flow of compressed air and a large force to dislodge and fluidize the catalyst pellets, but this implies a larger nozzle and corresponding larger hose to the nozzle, which increases the bridging problem. On the other hand, in order to reduce bridging, it is desirable to have a small nozzle and a corresponding small hose to deliver the compressed air to the nozzle, but this implies, at least in the prior art nozzles, a smaller volume of air and a lower resulting force exerted on the catalyst pellets by the stream of pressurized air exiting the nozzle. While it is possible to get more compressed air flow through the prior art nozzles by increasing the pressure of the pressurized air source, this requires access to a source for higher and higher pressure compressed air. Also, for a given length of hose, the pressure-drop across a given hose length increases significantly with reduced hose diameter, so it is very desirable to use the lowest air pressure possible to do the job.

SUMMARY

The present invention relates to an arrangement for unloading pellets from tubes by inserting an air lance through the top opening of the tube to inject a pressurized fluid, such as air, which acts to fluidize the catalyst inside the tube, and by vacuuming out the catalyst pellets that have been fluidized. A vacuum line is connected to the top opening of the tube to pull out the air being injected by the air lance, together with the fluidized pellets. The vacuumed air and pellets are conveyed to a cyclone separator where the pellets are recovered before the air is exhausted to the ambient.

An embodiment of the present invention provides a nozzle design for use in unloading pellets from tubes wherein choked flow is avoided when traversing the nozzle, and supersonic flow is achieved, resulting in a higher volume of air flowing through the nozzle and a higher resulting force exerted on the pellets by the stream of pressurized air exiting the nozzle than is possible in prior art nozzles. This permits a smaller diameter nozzle to be used, which reduces the opportunity for bridging.

In another embodiment, a thin piece of rod is secured to the nozzle with the free end of the rod projecting about one inch beyond the end of the nozzle. The end of the rod acts as a feeler for the operator to be able to "sense" where the nozzle is relative to the remaining level of the settled bed of pellets in the tube and prevents the nozzle from being pressed directly against the settled bed of pellets. The end of the rod also can be used to poke at the pellets and help dislodge them so the air flow from the nozzle can pick them up.

DESCRIPTION

Figure 1:
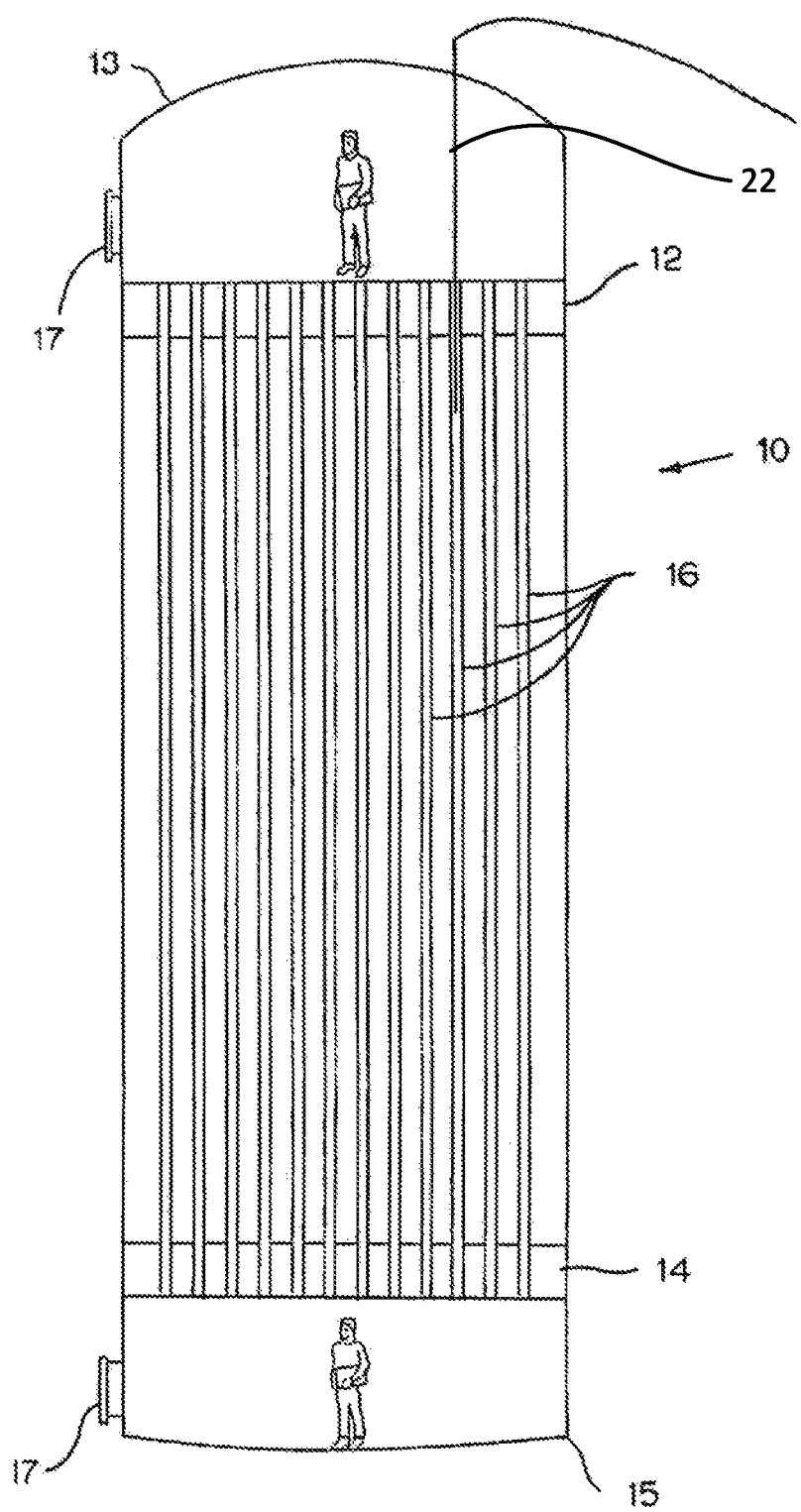
FIG. 1 is a schematic, section view of a shell and tube type of chemical reactor vessel.
Figure 2:
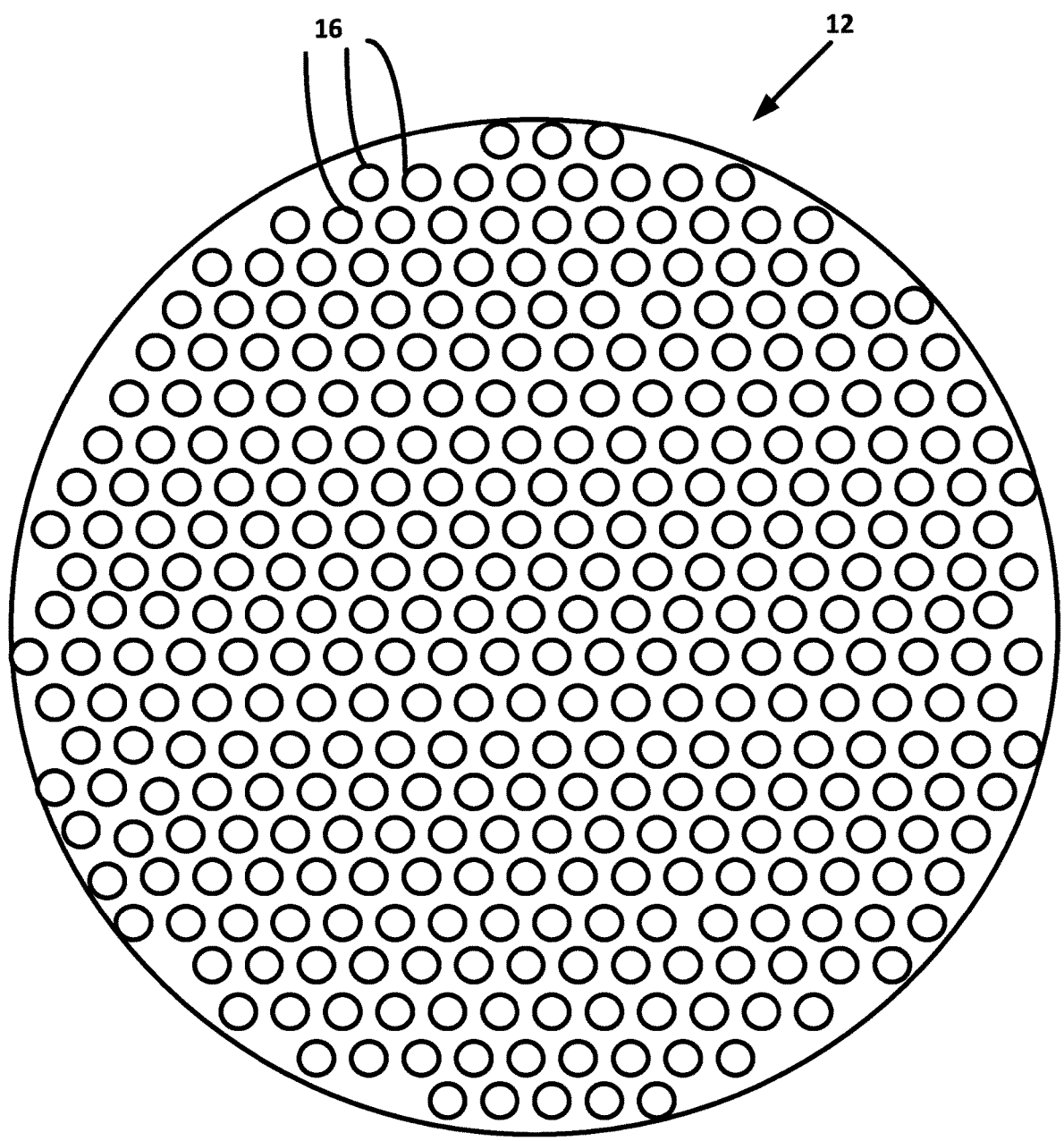
FIG. 2 is a plan view of the upper tubesheet of the reactor vessel of FIG. 1.

FIG. 1 depicts a typical chemical reactor vessel 10, which is a shell and tube heat exchanger, having an upper tubesheet 12 and a lower tubesheet 14 with a plurality of vertical tubes 16 welded or expanded to the tubesheets 12, 14 to form a tightly packed tube bundle. There may be from one to many hundreds or even thousands of cylindrical tubes 16 (See also FIG. 2) extending between the tubesheets 12, 14. Each tube 16 has a top end secured to the upper tubesheet 12 and a bottom end secured to the lower tubesheet 14, and the tubes 16 are open at both ends, except that there may be a spring, clip or grid 32 (See FIG. 4) at the bottom end to retain catalyst pellets inside the tube. The upper and lower tubesheets 12, 14 have openings that are the size of the outside diameter of the tubes 16, with each tube 16 being located in respective openings in the upper and lower tubesheets 12, 14.

The vessel 10 includes a top dome (or top head) 13 and a bottom dome (or bottom head) 15, as well as manways 17 for access to the tubesheets 12, 14 inside the vessel 10. The manways 17 are closed during operation of the reactor but are opened for access, such as during catalyst handling. In this instance, the tubes 16 are filled with catalyst pellets, which facilitate the chemical reaction. Other, non-catalyst pellets, such as filler pellets, also may be inside the tube, and they are referred to herein as catalyst pellets as well.

Reactors have either fixed or removable heads. In this embodiment, the heads are fixed, and they include manways 17 at the top and at the bottom.

This particular reactor vessel 10 is fairly typical. Its tubes can range in length from 5 feet to 65 feet, and it is surrounded by a structural steel skid or framework (not shown), which includes stairways or elevators for access to the tubesheet levels of the reactor vessel 10 as well as access to intermediate levels and to a topmost level which may be located at or near the level of the top opening of the reactor vessel 10. On a regular basis, which can be every 2 to 48 months or longer, as the catalyst becomes less efficient, less productive, or "poisoned", it is changed out, with the old catalyst being removed and a new charge of catalyst being installed in the tubes 16 of the reactor vessel 10. Catalyst handling also may have to be done on an emergency basis, on an unplanned and usually undesirable schedule.

A catalyst change operation involves a complete shutdown of the reactor, which may result in considerable cost due to lost production. It is desirable to minimize the amount of time required for the catalyst change operation in order to minimize the lost production and accompanying cost caused by the reactor shutdown as well as for other reasons.

Figures 3, 4:
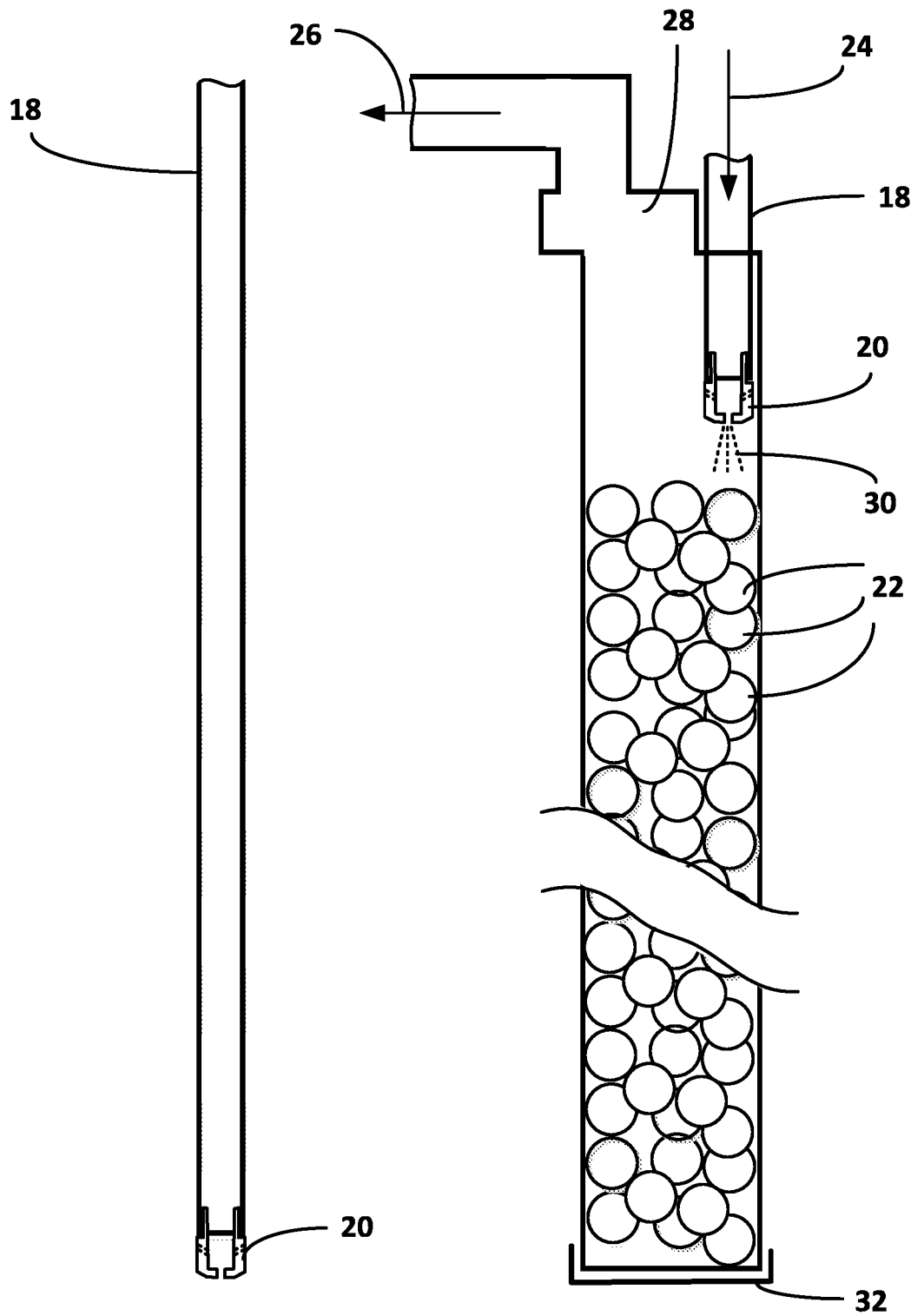
FIG. 3 is a broken away side sectional view of an air lance hose and nozzle arrangement for unloading catalyst pellets from a reactor tube.
FIG. 4 is a partially broken-away side sectional view of a single, catalyst-filled, reactor tube with the air lance hose and nozzle arrangement of FIG. 3 inserted at the top of the tube and showing the compressed air inlet and the vacuum line out.
Figure 5:
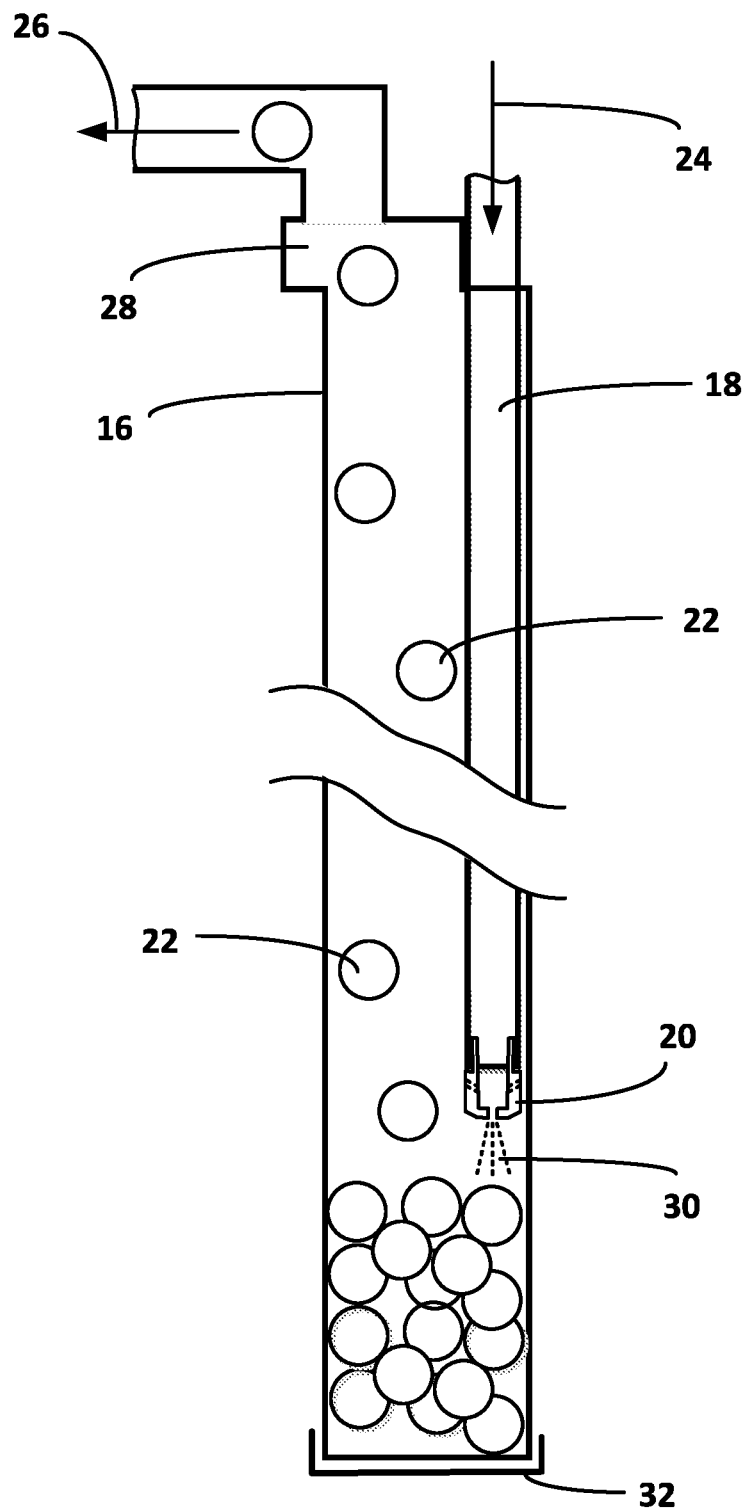
FIG. 5 is the same view as in FIG. 4 but with the hose and nozzle arrangement inserted almost fully down the reactor tube and showing pellets leaving upwardly through the tube.

FIGS. 3-5 show a hose 18 and nozzle 20 arrangement used for unloading catalyst pellets 22 from a reactor tube 16. The catalyst unloading arrangement also typically includes a compressed air source 24 to inject compressed air via the hose 18 to and through the nozzle 20. A vacuum source 26 is secured to the top of the reactor tube 16 via a manifold 28, to evacuate any catalyst pellets 22 which have been dislodged and fluidized by the pressurized air 30 expelled by the nozzle 20. This hose/nozzle/vacuum manifold arrangement may be used with prior art nozzles and with the nozzle of the present invention.

Figure 6:
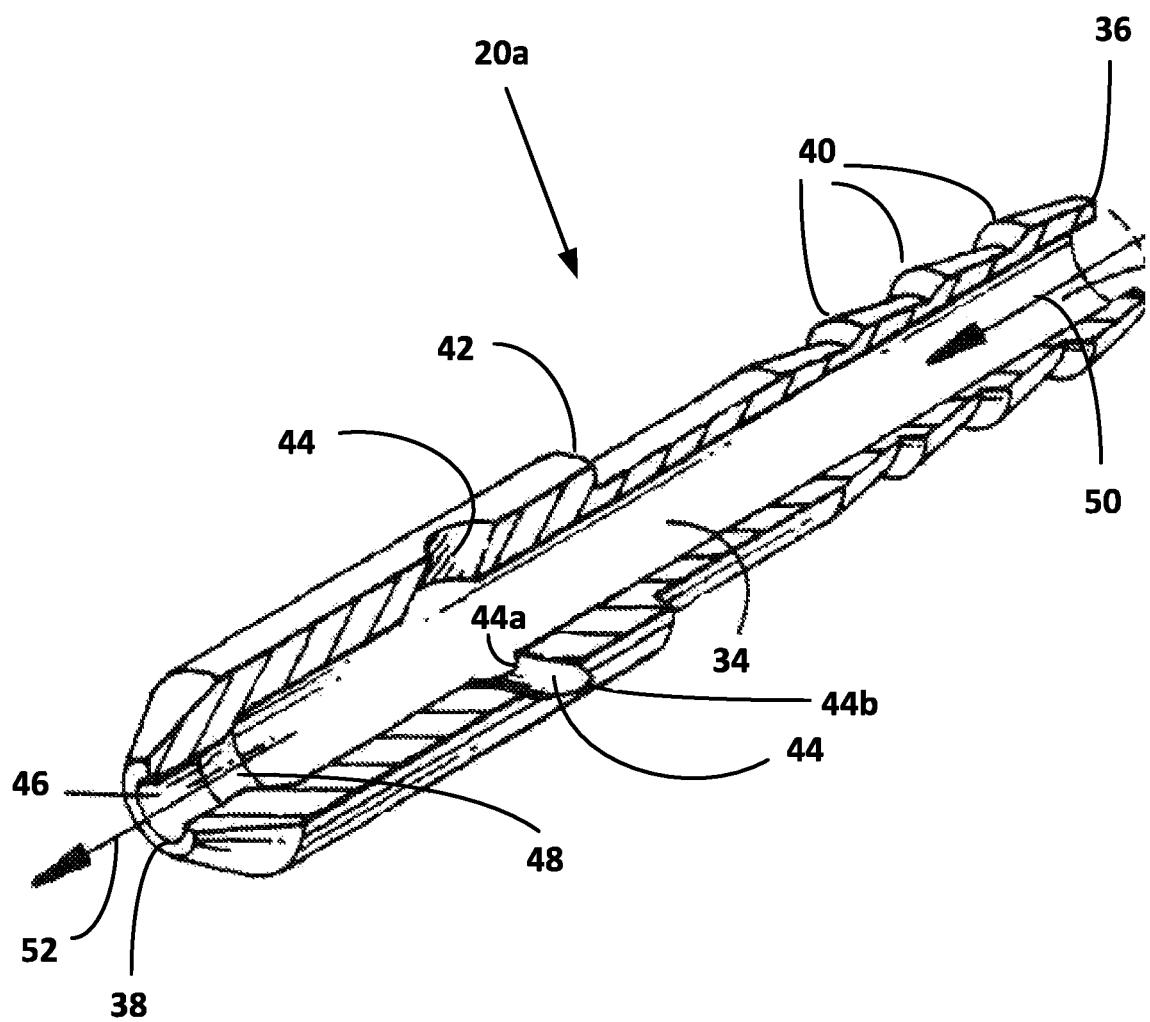
FIG. 6 is a side section view of a prior art air lance nozzle.

FIG. 6 is a perspective section view of a prior art air lance nozzle 20a, which is a hollow, generally cylindrical member defining a longitudinal cavity 34 having a tubular inner surface extending from an inlet end 36 to an outlet end 38. The arrow 50 is at the inlet end 36 (or upstream end) of the nozzle 20a. The arrow 52 is at the outlet end 38 (or downstream end) of the nozzle 20a.

A plurality of barbed projections 40 on the outer surface of the nozzle 20a adjacent the inlet end 36 serve to secure the hose 18 (not shown in this view) to the nozzle 20a. A shoulder 42 stops the end of the hose 18 as it is pushed along over the barbed portion of the nozzle 20a. A plurality of radially-directed vents 44 provide fluid communication from the cavity 34 to the outer surface of the nozzle 20a. These vents 44, each having a diameter which is smaller than the inside diameter of the cavity 34, are located around the periphery of the nozzle 20a in an imbalanced manner to urge the nozzle 20a against a wall of the reactor tube 16 as shown in FIGS. 4 and 5. Pushing the nozzle 20a and hose 18 against the wall of the reactor tube 16 provides greater cross-sectional area for the catalyst pellets 22 to exit the reactor tube 16 so as to minimize the potential bridging of the catalyst pellets as they exit the reactor tube 16. Each vent 44 extends from a vent inlet opening 44a on said tubular inner surface to a vent outlet opening 44b on said outer surface above said respective vent inlet opening. Fluid flowing through these vents 44 creates a downward force on the nozzle 20a.

The nozzle 20a has an opening at the inlet end 36, which opens into the tubular portion 34, which extends downstream to a converging inner surface 48, which is then followed downstream by a cylindrical inner surface 46, which terminates at a main discharge opening at the outlet end 38 of the nozzle 20a. The end surface of the outlet end 38 of the nozzle 20a is planar, defining a flat surface perpendicular to the axis of the nozzle 20a. The outer surface of the nozzle 20a is tapered for a short distance adjacent the outlet end 38 to facilitate insertion of the nozzle 20a into the reactor tube.

Figure 7:
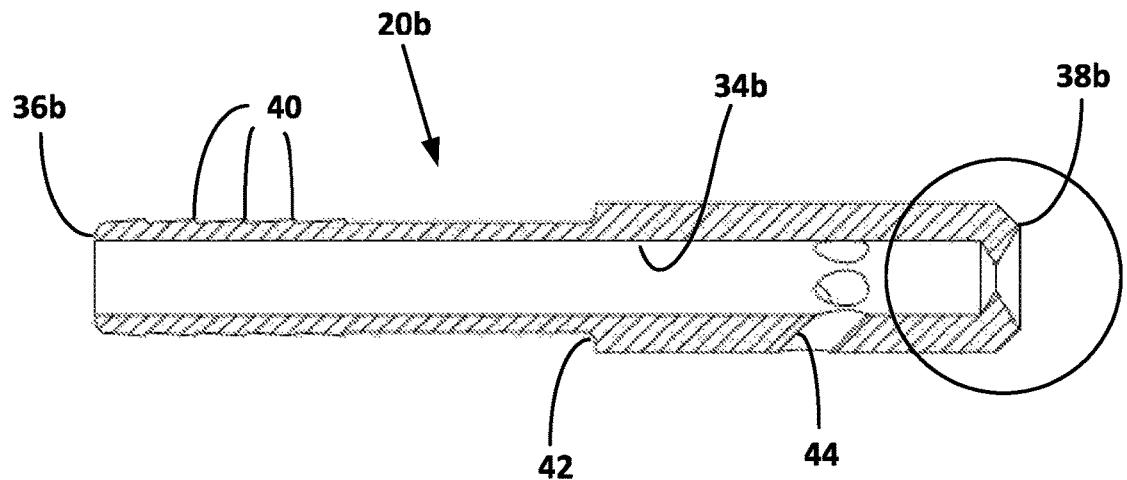
FIG. 7 is a side section view of an air lance nozzle in accordance with the present invention.
Figure 8:
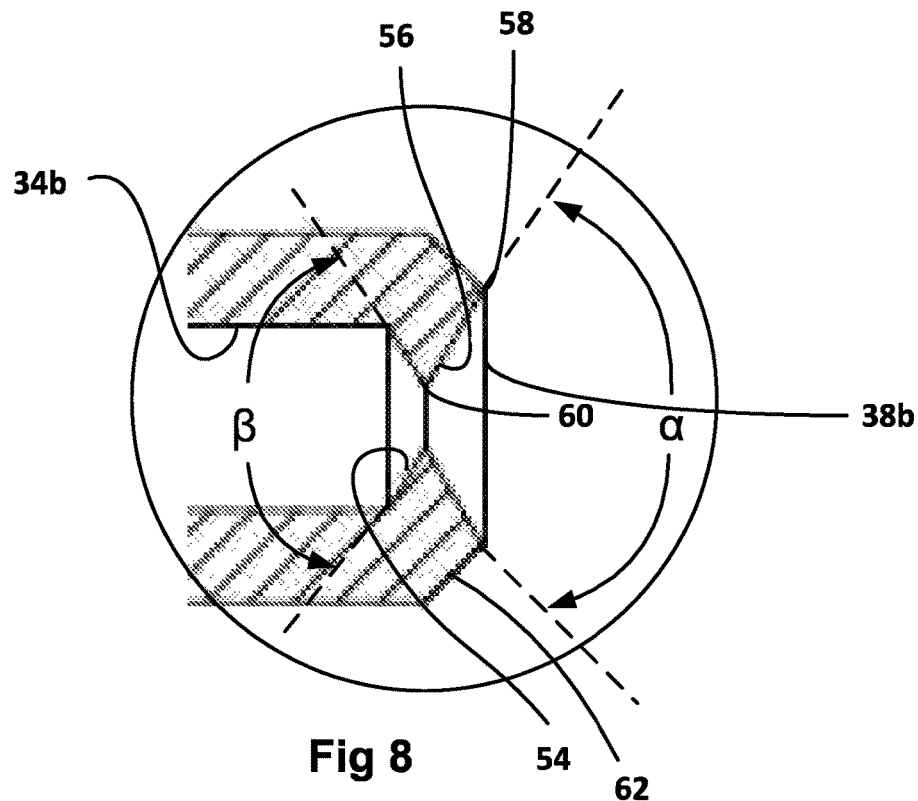
FIG. 8 is an enlarged view of the circled portion of the nozzle of FIG. 7.

Referring now to FIGS. 7 and 8, the air lance nozzle 20b, in accordance with an embodiment of the present invention, is similar to the nozzle 20a described earlier, differing mainly in the downstream end. The air lance nozzle 20b is a hollow, generally cylindrical member defining a longitudinal cavity having a tubular inner surface 34b extending from an inlet end 36b downstream to a converging inner surface 54, which is then followed downstream by a diverging inner surface 56, which terminates at a main discharge opening 58 at the outlet end 38b. The converging inner surface 54 and the diverging inner surface 56 meet at a sharp neck 60, which is recessed in from the outlet end 38b.

As with the prior art nozzle 20a, there is a plurality of barbed projections 40 on the outer surface of the nozzle 20b adjacent the inlet end 36b to secure the hose 18 to the nozzle 20b. A shoulder 42 stops the hose 18 as it is pushed over the barbed portion of the nozzle 20b. The shoulder 42 has an outside diameter the same as the outside diameter of the cylindrical lower portion of the nozzle body. This nozzle 20b also has a plurality of radially-directed vents 44, which push the nozzle 20b against the inner wall of the tube 16 and push the nozzle 20b downwardly in the tube 16 as described earlier with respect to the prior art nozzle 20a.

The outer surface of the air lance nozzle 20b includes an inwardly tapering portion 62 adjacent the outlet end 38b to facilitate insertion as in the prior art nozzle 20a, but, in this nozzle 20b, the diverging inner surface 56 and the tapering outer surface portion 62 meet to define a sharp ring 58 at the outlet end 38b. This contrasts with the flat end at the outlet of the prior art nozzle 20a.

In this embodiment, each of the converging inner surface 54 and the diverging inner surface 56 defines a conical shape. The angle β of the cone defined by the converging inner surface 54 is approximately 118 degrees. Applicant assumes that some range around the 118 degree angle will function nearly as well but has not tested other angles of the converging inner surface 54. The angle α defined by the diverging inner surface 56 is between 110 degrees and 130 degrees; and preferably between 115 degrees and 125 degrees. The tapered portion 62 of the outer surface also defines a conical shape.

Testing has shown that this air lance nozzle 20b performs far better than the prior art air lance nozzle 20a.

An embodiment of this air lance nozzle 20b having a largest outside diameter of ⅜", a smallest inside diameter of ⅛" at the point 60 where the converging inner surface 54 and diverging inner surface 56 meet, an angle β of 118 degrees and an angle α of 120 degrees was tested against a prior art nozzle 20a having a largest outside diameter of ⅜" and a smallest inside diameter at the cylindrical surface 46 of ⅛". The output force of the nozzle was measured in pounds by directing the output flow against a scale while holding the nozzle still, and the test results showed an overall output force improvement of almost 27% by this nozzle 20b over the prior art nozzle 20a over a typical range of air pressures. The test results are shown below:

| Input Pressure (PSI) | Nozzle 20a output force (lbs) | Nozzle 20b output force (lbs) | % Increase |
|---|---|---|---|
| 50 | 0.6944 | 0.8664 | 24.77 |
| 60 | 0.7981 | 1.0207 | 27.89 |
| 70 | 0.9105 | 1.1707 | 28.58 |
| 80 | 1.0626 | 1.3272 | 24.90 |
| 90 | 1.1795 | 1.4947 | 26.72 |
| 100 | 1.3338 | 1.6865 | 26.44 |
| 110 | 1.455 | 1.8475 | 26.98 |

Figure 9:
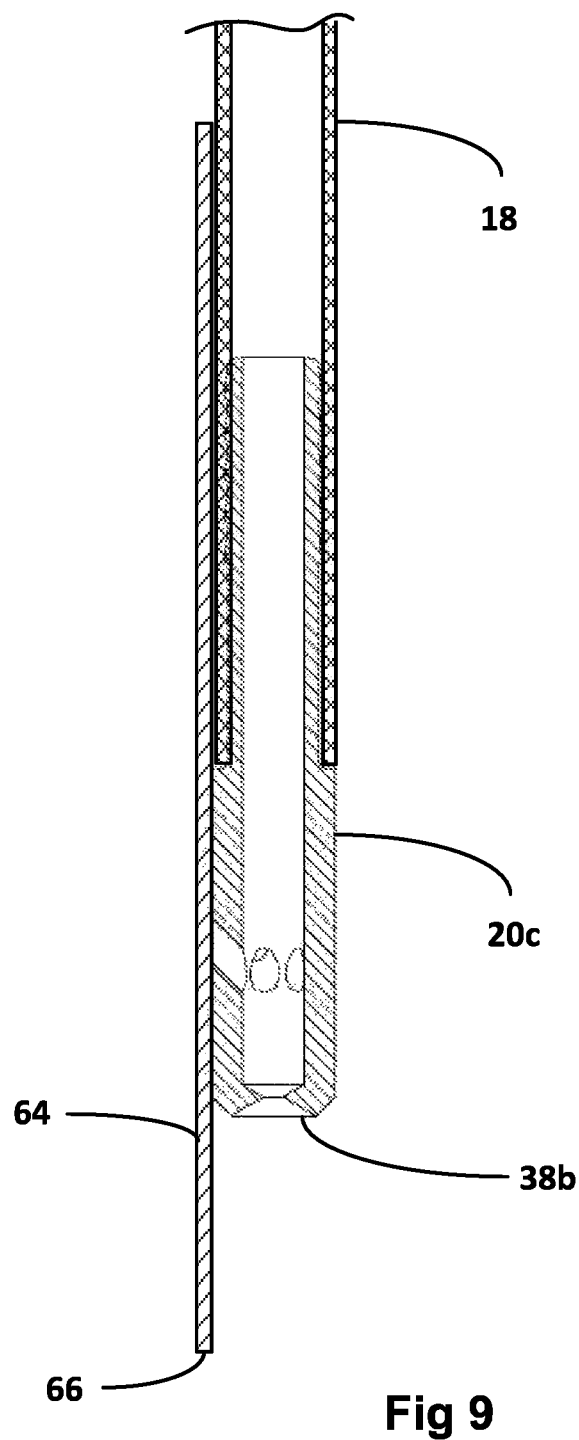
FIG. 9 is a side section view, similar to FIG. 7 but showing an alternative embodiment of the nozzle arrangement.

FIG. 9 shows a section view of a second embodiment of a nozzle 20c made in accordance with the present invention. The nozzle 20c is identical to the nozzle 20b described earlier except it includes a thin piece of rod 64 which is secured to the nozzle 20c such that the distal end (free end) 66 of the rod 64 projects beyond the outlet end 38c of the nozzle 20c. In this embodiment, the distal end 66 of the rod 64 projects one inch beyond the outlet end 38c of the nozzle 20c. It is preferred that the distal end 66 of the rod 64 project beyond the outlet end of the nozzle a distance at least as great as the largest outside diameter of the nozzle. The rod 64 has a diameter much smaller than the largest outside diameter of the nozzle, such as a rod diameter of 0.1" for a nozzle having a largest outside diameter of ⅜". It is preferable that the rod diameter be less than half the largest outside diameter of the nozzle.

The portion of the rod 64 extending beyond the outlet end of the nozzle is a projection, which is fixed relative to the nozzle. The distal end 66 of the projecting portion of the rod 64 acts as a feeler for the operator to be able to sense where the nozzle 20c is relative to the layer of catalyst pellets 22, because the operator can feel a slight slackening of the hose 18 when the distal end 66 of the rod 64 bumps into the resting bed of catalyst pellets. The distal end 66 of the rod 64 also acts as a spacer to prevent the end 38b of the nozzle 20c from bumping into the resting bed of catalyst pellets. The distal end 66 of the projecting portion of the rod 64 also can be used as a poker to poke at the pellets and help dislodge them so the air flow from the nozzle can pick them up.

The rod 64 is secured to the nozzle 20c such that both the rod 64 and the nozzle 20c are longitudinally aligned (their longitudinal axes are parallel). The rod 64 may be secured to the nozzle 20c by any means desirable, such as by taping them together or by welding them together. The rod 64 also provides additional stiffness to the hose 18 and nozzle 20c arrangement to help prevent kinking of the hose or twisting of the nozzle 20c relative to the hose 18 due to the forces caused by the high operating pressure of the device.

It will be obvious to those skilled in the art that modifications may be made to the embodiments described above without departing from the scope of the invention as claimed.

What is claimed is:

1. An air lance for removing pellets from tubes, comprising:
    a nozzle body, having an inlet end, an outlet end; an outer surface, and a main internal passageway from said inlet end to said outlet end, wherein said main internal passageway defines a tubular inner surface extending downstream from said inlet end toward said outlet end, followed downstream by a converging inner surface, which is then followed downstream by a diverging inner surface which terminates at a main discharge opening at said outlet end, wherein said converging and diverging inner surfaces meet at a sharp neck; and wherein said nozzle body further comprises a plurality of small diameter vents, each having a smaller diameter than said tubular inner surface and extending from a vent inlet opening on said tubular inner surface to a vent outlet opening on said outer surface;
    wherein said outer surface of said nozzle body tapers inwardly to a smaller diameter at said outlet end; and
    wherein said inwardly tapered outer surface and said diverging inner surface meet at a sharp ring at said main discharge opening.

2. An air lance for removing pellets from tubes as recited in claim 1, wherein said converging inner surface defines an inwardly tapered conical portion having an angle β of approximately 118 degrees.

3. An air lance for removing pellets from tubes as recited in claim 1, wherein said diverging inner surface defines an outwardly tapered conical portion having an angle α of between 110 degrees and 130 degrees.

4. An air lance for removing pellets from tubes as recited in claim 2, wherein said diverging inner surface has a conical shape.

5. An air lance for removing pellets from tubes as recited in claim 4, wherein said converging inner surface has a conical shape.

6. An air lance for removing pellets from tubes as recited in claim 5, wherein said inwardly tapering outer surface has a conical shape.

7. An air lance for removing pellets from tubes as recited in claim 1, and further comprising a rod secured to said outer surface of said nozzle, said rod having a distal end that projects beyond said main discharge opening of said nozzle to serve as a spacer and feeler.

8. An air lance for removing pellets from tubes as recited in claim 6, and further comprising a rod secured to said outer surface of said nozzle, said rod having a distal end that projects beyond said main discharge opening of said nozzle to serve as a spacer and feeler.

9. An air lance for removing pellets from tubes, comprising:
   a nozzle body, having an inlet end, an outlet end; an outer surface, and a main internal passageway from said inlet end to said outlet end, wherein said main internal passageway defines a tubular inner surface extending downstream from said inlet end toward said outlet end; wherein said inlet end is connected to a non-rigid hose and said outlet end provides a main discharge opening for dispensing fluid proximate to a bed of catalyst material; wherein said nozzle body further comprises a plurality of small diameter vents, each having a smaller diameter than said tubular inner surface and extending from a vent inlet opening on said tubular inner surface to a vent outlet opening on said outer surface; and
   a rod secured to said outer surface of said nozzle, said rod having a distal end that projects beyond said main discharge opening of said nozzle to serve as a spacer and feeler;
   whereby said rod allows an operator of the air lance to sense a slackening of the hose as feedback of the location of the nozzle relative to the catalyst material.

10. An air lance for removing pellets from tubes as recited in claim 9, wherein said nozzle body has a largest outside diameter and said rod has an outside diameter that is less than half the largest outside diameter of said nozzle body.

11. An air lance for removing pellets from tubes as recited in claim 10, wherein said rod projects beyond the main discharge opening of said nozzle a distance at least as great as the largest outside diameter of said nozzle.

12. An air lance for removing pellets from tubes as recited in claim 11, wherein said tubular inner surface of said nozzle, which extends downstream from said inlet end toward said outlet end is followed downstream by a converging inner surface, which is then followed downstream by a diverging inner surface which terminates at said main discharge opening at said outlet end, wherein said converging and diverging inner surfaces meet at a sharp neck.

13. An air lance for removing pellets from tubes, comprising:
   a tubular nozzle body, having an inlet end, an outlet end defining a bottommost discharge opening, an outer surface, a main internal passageway from said inlet end to said outlet end, a plurality of vents extending from said main internal passageway to said outer surface, each of said vents having a smaller diameter than said tubular inner surface; and a projection fixed relative to said tubular nozzle body and projecting beyond said bottommost discharge opening to serve as a spacer and poker;
   wherein said main internal passageway defines a tubular inner surface extending downstream from said inlet end toward said outlet end, followed downstream by a converging inner surface, which is then followed downstream by a diverging inner surface which terminates at said bottommost discharge opening, wherein said converging and diverging inner surfaces meet at a sharp neck;
   wherein said outer surface of said nozzle body tapers inwardly to a smaller diameter at said outlet end; and
   wherein said inwardly tapered outer surface and said diverging inner surface meet at a sharp ring at said main discharge opening.

14. An air lance for removing pellets from tubes as recited in claim 13, wherein said tubular nozzle body has a largest outside diameter, and wherein said projection projects beyond said outlet end a distance at least as great as said largest outside diameter.

15. An air lance for removing pellets from tubes as recited in claim 14, wherein said projection is a thin piece of rod secured to the tubular nozzle body.

16. An air lance for removing pellets from tubes as recited in claim 13, wherein said converging inner surface defines an inwardly tapered conical portion having an angle $\beta$ of approximately 118 degrees.

17. An air lance for removing pellets from tubes as recited in claim 14, wherein said diverging inner surface defines an outwardly tapered conical portion having an angle $\alpha$ of between 110 degrees and 130 degrees.

\* \* \* \* \*